US011739625B2

(12) United States Patent
Zalluhoglu et al.

(10) Patent No.: US 11,739,625 B2
(45) Date of Patent: Aug. 29, 2023

(54) TRAJECTORY CONTROL FOR DIRECTIONAL DRILLING USING FORMATION EVALUATION MEASUREMENT FEEDBACK

(71) Applicant: Halliburton Energy Services, Inc., Houston, TX (US)

(72) Inventors: Umut Zalluhoglu, Humble, TX (US); Wei Zhang, Humble, TX (US); Mevis Juliana Tarazona Mercado, The Woodlands, TX (US); Richard T. Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 267 days.

(21) Appl. No.: 16/776,309

(22) Filed: Jan. 29, 2020

(65) Prior Publication Data

US 2021/0230993 A1 Jul. 29, 2021

(51) Int. Cl.
*E21B 44/00* (2006.01)
*E21B 47/024* (2006.01)
*E21B 49/00* (2006.01)
*E21B 7/04* (2006.01)

(52) U.S. Cl.
CPC ............. *E21B 44/00* (2013.01); *E21B 7/04* (2013.01); *E21B 47/024* (2013.01); *E21B 49/003* (2013.01)

(58) Field of Classification Search
CPC ... E21B 44/00; E21B 7/04; E21B 7/06; E21B 47/024; E21B 49/003
See application file for complete search history.

(56) References Cited

U.S. PATENT DOCUMENTS

| 9,250,349 | B2 | 2/2016 | Donderici et al. |
| 10,267,137 | B2 | 4/2019 | May et al. |
| 2010/0175922 | A1 | 7/2010 | Ignova et al. |
| 2011/0132663 | A1 | 6/2011 | Johnston et al. |
| 2012/0273270 | A1* | 11/2012 | Rasheed ................. G01V 1/46 175/24 |

(Continued)

FOREIGN PATENT DOCUMENTS

| WO | 2018144169 | 8/2018 | |
| WO | WO-2018144169 A1 * | 8/2018 | ............ E21B 41/00 |

OTHER PUBLICATIONS

Parker, "Illuminate Your Reservoir with a New, Industry-Leading Ultra-Deep LWD Resistivity Service", Harts Journal EPMag.com, Sep. 2018, pp. 60-61.

(Continued)

*Primary Examiner* — Dany E Akakpo
(74) *Attorney, Agent, or Firm* — Kilpatrick Townsend & Stockton LLP

(57) ABSTRACT

A method for controlling a drilling trajectory of a wellbore includes receiving a target trajectory reference of a drill bit within a wellbore from a formation model. The method also includes receiving real-time formation evaluation measurements from at least one sensor positioned within the wellbore and computing a target trajectory set-point change based on the real-time formation evaluation measurements. Further, the method includes generating a target trajectory from the target trajectory reference and the target trajectory set-point change and steering the drill bit using the target trajectory.

17 Claims, 11 Drawing Sheets

(56) References Cited

U.S. PATENT DOCUMENTS

| | | |
|---|---|---|
| 2014/0291024 A1 | 10/2014 | Sugiura et al. |
| 2017/0096887 A1* | 4/2017 | Wilson ...................... E21B 7/04 |
| 2017/0306701 A1* | 10/2017 | Wu .......................... G06G 7/48 |
| 2017/0328850 A1 | 11/2017 | Hay et al. |
| 2017/0342815 A1 | 11/2017 | Hay |
| 2018/0179879 A1 | 6/2018 | Ma et al. |
| 2018/0224573 A1 | 8/2018 | Yang et al. |

OTHER PUBLICATIONS

PCT Application No. PCT/US2020/015733, International Search Report and Written Opinion, dated Oct. 22, 2020, 13 pages.

\* cited by examiner

TRAJECTORY CONTROL FOR DIRECTIONAL DRILLING USING FORMATION EVALUATION MEASUREMENT FEEDBACK

TECHNICAL FIELD

The present disclosure relates generally to systems and methods for use in a well-drilling environment. More specifically, but not by way of limitation, this disclosure relates to controlling a wellbore drilling trajectory using formation evaluation measurement feedback.

BACKGROUND

As wellbores are drilled into a formation, a drilling trajectory may stray from a target formation indicated in a well plan. A directional driller may correct for the stray (i.e., a wellbore trajectory error) by downlinking inclination and azimuth set-point changes or set points to a rotary steerable system that steers a drill bit. The inclination and azimuth set-point changes may be based on formation or geosteering models available at the surface of the wellbore and updateable using measurement-while-drilling (MWD) and logging-while-drilling (LWD) measurements. Measurements from within the wellbore may be received at the surface of the wellbore, and trajectory changes for the drill bit may also be determined at the surface of the wellbore. The trajectory changes may then be downlinked to the rotary steerable system. In an example, a time it takes to collect data at the surface, analyze the data, and provide the trajectory change downhole may take minutes. Depending on a rate of penetration of the drill bit, the lag may result in drilling out of a target zone.

Further, depending on a skill of the directional driller, the downlinked inclination and azimuth set-point changes may be inaccurate. Inaccuracies in the inclination and azimuth set-point changes may result in further wellbore trajectory error and oscillatory boreholes. Additionally, reliance on the directional driller to downlink the inclination and azimuth set-point changes may result in a further lag in providing the trajectory change to the rotary steerable system. The lag may not account for additional wellbore trajectory error that occurs while the directional driller is determining the new inclination and azimuth set-point changes.

DETAILED DESCRIPTION

Figure 1:
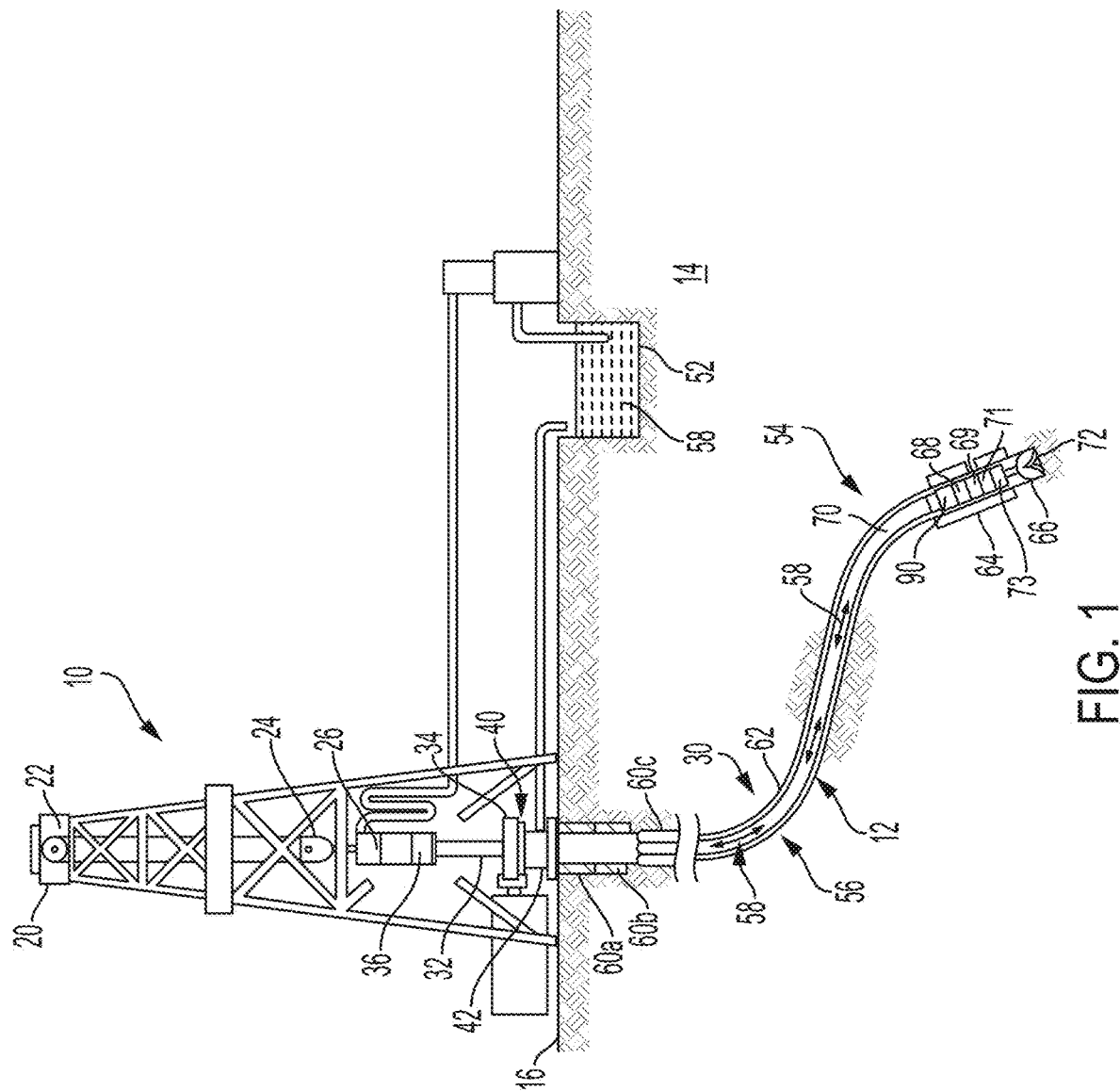
FIG. 1 is a cross-sectional view of an example of a well system incorporating a trajectory control system according to one aspect of the present disclosure.

Certain aspects and features relate to a trajectory control system usable for controlling a rotary steerable system during a wellbore drilling operation. For example, the trajectory control system can receive information from sensors capable of determining formation characteristics surrounding the rotary steerable system that is positioned within the wellbore. Based on the formation characteristics, the trajectory control system can maintain the rotary steerable system within a target formation by adjusting inclination and azimuth set-points of a drill bit. That is, the trajectory control system can determine a formation characteristics of the formation surrounding a drill bit, and adjust a trajectory of the drill bit to maintain the drill bit within a target formation based on the formation characteristics.

The formation models may include an indication of particular formation characteristics that are relevant to production of hydrocarbons in oil and gas wells. As the wellbore is drilled, measurement-while-drilling (MWD) and logging-while-drilling (LWD) measurements may be used to update the formation models to more accurately represent the formations encountered during the drilling operation. Further, while the formation models may initially be used to control the trajectory of the drill bit through the rotary steerable system, the MWD and LWD measurements may be relied upon to maintain the drill bit within the target formation. For example, the MWD and LWD measurements may be used by the trajectory control system to automatically regulate inclination and azimuth set points used by a cruise controller (i.e., an attitude-hold controller) of the rotary steerable system.

Some examples can provide systems and methods usable to control a trajectory of a rotary steerable system during a drilling operation of a wellbore to increase pay zone contact while reducing an amount of surface to downhole communication. A target trajectory reference may be received from a formation model that estimates the geology surrounding a target bed. As the drill bit drills into the formation, sensors may provide real-time formation evaluation measurements to the trajectory control system from a formation evaluation while drilling (FEWD) tools, LWD tools, MWD tools, or a combination thereof. Based on the real-time formation evaluation measurements, the trajectory control system may determine corrective attitude (i.e., inclination angle and azimuth angle) set-point changes for the drill bit. A target trajectory reference may be adjusted with the corrective attitude set-point change to determine the new trajectory set point. The new trajectory set point may be provided to the cruise control of the rotary steerable system to maintain the drill bit in the target formation. The formation model may also be updated based on the real-time formation evaluation measurements, and the target trajectory reference may be updated based on the updated formation model. This process (i.e., trajectory updates and formation model updates) may be repeated until the drilling operation in the wellbore is completed.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of a well system 10 incorporating a trajectory control system 90 according to some examples of the present disclosure. The well system 10 can include a wellbore 12 extending through various earth strata in an oil and gas formation 14 (e.g., a subterranean formation) located below the well surface 16. The wellbore 12 may be formed of a single bore or multiple bores extending into the formation 14, and disposed in any orientation. The well system 10 can include a derrick or drilling rig 20. The drilling rig 20 may include a hoisting apparatus 22, a travel block 24, and a swivel 26 for raising and lowering casing, drill pipe, coiled tubing, and other types of pipe or tubing strings or other types of conveyance vehicles, such as wireline, slickline, and the like. The wellbore 12 can include a drill string 30 that is a substantially tubular, axially-extending drill string formed of drill pipe joints coupled together end-to-end.

The drilling rig 20 may include a kelly 32, a rotary table 34, and other equipment associated with rotation or translation of drill string 30 within the wellbore 12. For some applications, the drilling rig 20 may also include a top drive unit 36. The drilling rig 20 may be located proximate to a wellhead 40, as shown in FIG. 1, or spaced apart from the wellhead 40, such as in the case of an offshore arrangement. One or more pressure control devices 42, such as blowout preventers (BOPS) and other well equipment may also be provided at wellhead 40 or elsewhere in the well system 10.

A drilling or service fluid source 52 may supply a drilling fluid 58 pumped to the upper end of the drill string 30 and flowed through the drill string 30. The fluid source 52 may supply any fluid utilized in wellbore operations, including drilling fluid, drill-in fluid, acidizing fluid, liquid water, steam, or some other type of fluid.

The well system 10 may have a pipe system 56. For purposes of this disclosure, the pipe system 56 may include casing, risers, tubing, drill strings, subs, heads or any other pipes, tubes or equipment that attaches to the foregoing, such as the drill string 30, as well as the wellbore and laterals in which the pipes, casing, and strings may be deployed. In this regard, the pipe system 56 may include one or more casing strings 60a-60c cemented in the wellbore 12, such as the surface 60a, intermediate 60b, and other casing strings 60c shown in FIG. 1. An annulus 62 is formed between the walls of sets of adjacent tubular components, such as concentric and non-concentric casing strings 60 or the exterior of drill string 30 and the inside wall of the wellbore 12 or the casing string 60c.

Where the subsurface equipment 54 is used for drilling and the conveyance vehicle is a drill string 30, the lower end of the drill string 30 may include a bottom hole assembly 64, which may carry at a distal end a drill bit 66. During drilling operations, a weight-on-bit is applied as the drill bit 66 is rotated, thereby enabling the drill bit 66 to engage the formation 14 and drill the wellbore 12 along a predetermined path toward a target zone. In general, the drill bit 66 may be rotated with the drill string 30 from the drilling rig 20 with the top drive unit 36 or the rotary table 34, or with a downhole mud motor 68 within the bottom hole assembly 64.

The bottom hole assembly 64 or the drill string 30 may include various other tools, including a power source 69, a rotary steerable system 71, and measurement equipment 73, such as measurement while drilling (MWD) or logging while drilling (LWD) instruments, sensors, circuits, or other equipment to provide information about the wellbore 12 or the formation 14, such as positioning, logging, or measurement data from the wellbore 12.

Measurement data and other information from the tools may be communicated using electrical signals, acoustic signals, or other telemetry that can be received at the well surface 16 to, among other things, monitor the performance of the drill string 30, the bottom hole assembly 64, and the associated drill bit 66, as well as monitor the conditions of the environment to which the bottom hole assembly 64 is subjected (e.g., drilling fluid 58 flow rate, formation characteristics, etc.).

The drilling fluid 58 may be pumped to the upper end of drill string 30 and flow through a longitudinal interior 70 of the drill string 30, through the bottom hole assembly 64, and exit from nozzles formed in the drill bit 66. At the bottom end 72 of the wellbore 12, the drilling fluid 58 may mix with formation cuttings, formation fluids (e.g., fluids containing gasses and hydrocarbons) and other downhole fluids and debris. The drilling fluid mixture may then flow upwardly through an annulus 62 to return formation cuttings and other downhole debris to the well surface 16.

After drilling through a portion of the formation 14 or while drilling through the formation 14, the measurement equipment 73 can provide survey feedback to the trajectory control system 90. In some examples, the trajectory control system 90 can analyze the survey feedback from the measurement equipment 73 to determine a position (i.e., a true vertical depth and a lateral distance) and attitude (i.e., an inclination and an azimuth) of the drill bit 66 within the wellbore 12. The survey feedback information from the measurement equipment 73 can also provide information about formation characteristics of the formation 14 to the trajectory control system 90. The trajectory control system 90 can adjust the trajectory of the drill bit 66 by providing inclination and azimuth set-point changes to the rotary steerable system 71. The inclination and azimuth set-point changes may provide an indication of a new desired trajectory of the drill bit 66 to the rotary steerable system 71 to maintain the drill bit 66 in a target formation, as indicated by the measurement equipment 73. As the drill bit 66 continues to drill the wellbore 12, the trajectory control system 90 may continue to adjust the inclination and azimuth set-point changes based on the survey feedback information from the measurement equipment 73. Further, a formation model, which provides an indication of a target trajectory reference to the trajectory control system 90, may be continuously updated based on the survey feedback information from the measurement equipment 73.

While the trajectory control system 90 is depicted as part of the bottom hole assembly 64, in some examples the trajectory control system 90 may be implemented at the well surface 16. For example, the trajectory control system 90 may be operated at the well surface 16 along with other drilling control equipment. In some examples, the trajectory control system 90 may perform some operations within the wellbore 12 (e.g., adjusting the target trajectory of the drill bit 66) and other operations at an additional component of the trajectory control system 90 located at the well surface 16 (e.g., updating a formation model and reference trajectory). Additionally, while FIG. 1 depicts the trajectory control system 90 operating in a land-based drilling environment, the trajectory control system 90 may also be implemented in an offshore drilling environment.

Figure 2:
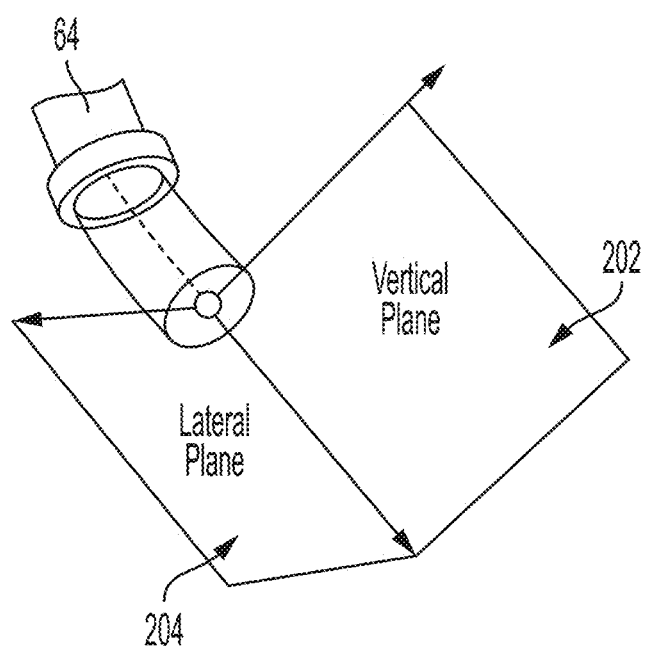
FIG. 2 depicts a vertical and lateral plane of a bottom hole assembly according to one aspect of the present disclosure.

FIG. 2 depicts a vertical plane 202 and lateral plane 204 of a bottom hole assembly according to one aspect of the present disclosure. The inclination set-point change may enable the rotary steerable system 71 of the bottom hole assembly 64 to control the drill bit 66 in the vertical plane 202. Additionally, the azimuth set-point change may enable the rotary steerable system 71 to control the drill bit 66 in the lateral plane 204. By combining the set-point changes to both the azimuth and the inclination, the rotary steerable system 71 is able to control direction of the drilling by the drill bit 66 toward the trajectory indicated by the well plan.

In an example, each time a new survey feedback is received by the trajectory control system 90 (e.g., indicating new information about formation characteristics surrounding the bottom hole assembly 64), a new set of inclination and azimuth set-point changes may be generated and provided to the rotary steerable system 71. The new survey feedback may be generated by the measurement equipment 73 during a stationary period of the drill bit 66 (e.g., while new sections of tubing are added to the drill string 30). In another example, the new survey feedback may be provided to the trajectory control system 90 periodically when the measurement equipment 73 provides continuous survey feedback during the drilling operations.

Figure 3:
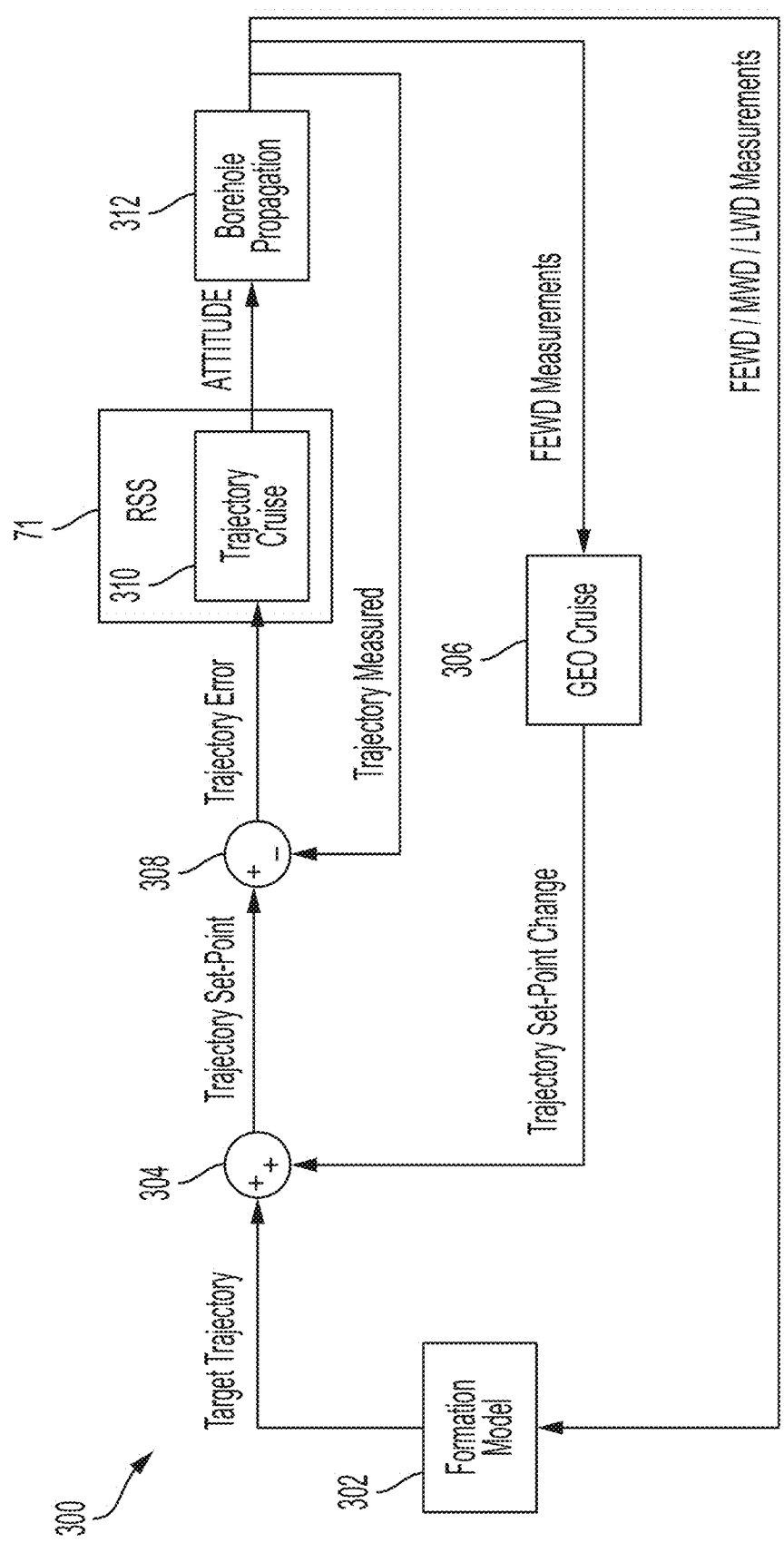
FIG. 3 depicts a block diagram of a trajectory control loop of a rotary steerable system according to one aspect of the present disclosure.

FIG. 3 depicts a block diagram of a trajectory control loop 300 of the rotary steerable system 71 according to one aspect of the present disclosure. Logic of the trajectory control loop 300 may be performed by the trajectory control system 90, which may be located at the bottom hole assembly 64 or at the surface 16 of the wellbore 12. A target trajectory of the drill bit 66 controlled by the rotary steerable system 71 may be received at an adder 304 from a formation model 302. The target trajectory may be generated based on a target formation indicated in the formation model 302. For example, the target trajectory may be formulated from the formation model 302 to maintain the drill bit 66 in a pay zone (i.e., a target formation) of the formation 14 during the drilling process. A trajectory set-point change may also be received at the adder 304 based on formation evaluation while drilling (FEWD) information received at a geological cruise control module 306 from one or more measurement tools 73. In an example, the FEWD information may be generated as survey feedback during the drilling operation. The adder 304 may combine the target trajectory with the trajectory set-point change to generate a new trajectory set-point. In an example, the new trajectory set-point may include a set-point for both an inclination angle (e.g., in the vertical plane 202) and an azimuth angle (e.g., in the lateral plane 204) of the drill bit 66.

The new trajectory set-point may be provided from the adder 304 to a subtractor 308. The subtractor 308 also receives a measured trajectory from a prior survey feedback measurement by one or more measurement tools 73. In an example, the measurement tools 73, such as MWD or LWD tools, provide an indication of the attitude of the drill bit 66. The attitude may include both an inclination angle and an azimuth angle of the drill bit 66. A trajectory error may be generated by the subtractor 308 by subtracting the measured trajectory from the new trajectory set-point. This trajectory error may be provided to a trajectory cruise control 310 of the rotary steerable system 71 to maintain the new trajectory set-point (i.e., attitude) of the drill bit 66. For example, providing the trajectory error to the trajectory cruise control 310 may enable steering of the drill bit 66 while compensating for the difference between the trajectory set-point and the measured trajectory.

Borehole propagation 312 may occur using the new trajectory set-point, and the measurement tools 73 may take new measurements with a subsequent survey feedback. The subsequent survey feedback by the measurement tools 73 may provide the trajectory measurements to the subtractor 308, the FEWD measurements to the geological cruise control module 306, and FEWD measurements, MWD measurements, LWD measurements, or a combination thereof to the formation model 302. When the formation model 302 receives the new measurements from the measurement tools 73, the formation model 302 may be updated, and a new target trajectory may be generated by the formation model 302.

In an example, the rotary steerable system 71 may only include the trajectory cruise control 310, while the remaining blocks of the trajectory control loop 300 are positioned as parts of other devices. In another example, the rotary steerable system 71 may include the adder 304, the geological cruise control module 306, the subtractor 308, and the trajectory cruise control 310. Such an example, may involve the rotary steerable system 71 having its own MWD package, FEWD package, LWD package, or a combination thereof.

Figure 4:
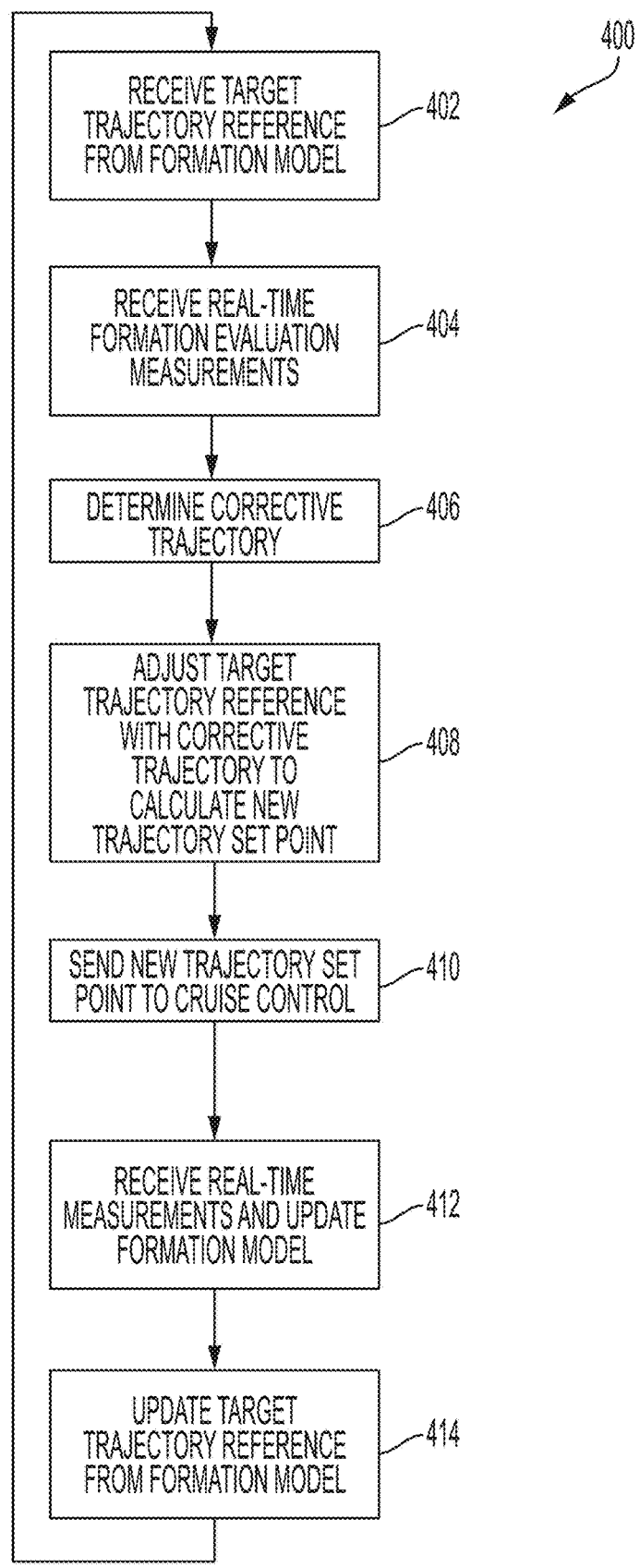
FIG. 4 is a flowchart describing a process for controlling a rotary steerable system according to one aspect of the present disclosure.

FIG. 4 is a flowchart describing a process 400 for controlling the rotary steerable system 71 according to one aspect of the present disclosure. For illustrative purposes, the process 400 is described with reference to certain examples depicted in the figures. Other implementations, however, are possible.

At block 402, the process 400 involves receiving a target trajectory reference from the formation model 302. The target trajectory reference may provide a reference attitude (i.e., inclination and azimuth) for the drill bit 66 at a particular location within the wellbore 12. Further, the target trajectory reference may be selected to maintain the drill bit 66 within a target formation based on the updateable formation model 302.

At block 404, the process 400 involves receiving real-time formation evaluation measurements. The real-time formation evaluation measurements may come from survey feedback performed by the measurement tools 73. For example, FEWD measurements taken by the measurement tools 73 may be received by the geological cruise control module 306.

At block 406, the process 400 involves determining a corrective trajectory from the real-time formation evaluation measurements received at block 404. For example, the formation evaluation measurements may indicate inconsistencies between the formation model 302 and the formation as measured by the measurement tools 73. In such an instance, the geological cruise control module 306 may generate a trajectory set-point change that corrects the target trajectory reference. In an example, the trajectory set-point change may be an indication of a change of the inclination angle, the attitude angle, or both of the target trajectory reference.

At block 408, the process 400 involves adjusting the target trajectory reference with the corrective trajectory (i.e., the trajectory set-point change) to calculate a new trajectory set-point of the drill bit. The new trajectory set-point may be used by the rotary steerable system 71 to control the trajectory of the drill bit 66 during a drilling operation.

At block 410, the process 400 involves sending the new trajectory set-point to a trajectory cruise control 310 of the rotary steerable system 71. The trajectory cruise control 310 may use the new trajectory set-point to maintain an attitude of the drill bit 66 during the drilling operation. In an example, the rotary steerable system 71 may control the drill bit 66 to continue drilling the wellbore 12 using the new trajectory set-point that is a function of the target trajectory reference and the measured trajectory of the drill bit 66.

At block 412, the process 400 involves receiving real-time measurements and updating the formation model 302 based on the real-time measurements. In an example, the real-time measurements may indicate that the formation 14 differs from the formation model 302. Using this indication, the formation model 302 may be updated to reflect the real-time information associated with the formation 14. The real-time measurements may be from FEWD tools, MWD tools, LWD tools, or any other formation measurement.

At block 414, the process 400 involves updating the target trajectory reference using the updated formation model 302. For example, the changes to the formation model 302 based on the real-time measurements may result in a target trajectory reference change to maintain the drill bit 66 within the target formation. The process 400 may then repeat at block 402 and continue in this manner until the drilling operation is completed.

In an example, blocks 402-410 may take place downhole at the rotary steerable system 71 within the wellbore 12, while blocks 412 and 414 take place at a surface of the wellbore 12. In another example, blocks 402-414 may all take place at the rotary steerable system 71 within the wellbore 12. In an additional example, blocks 402-414 may all take place at a surface of the wellbore 12.

Figure 5:
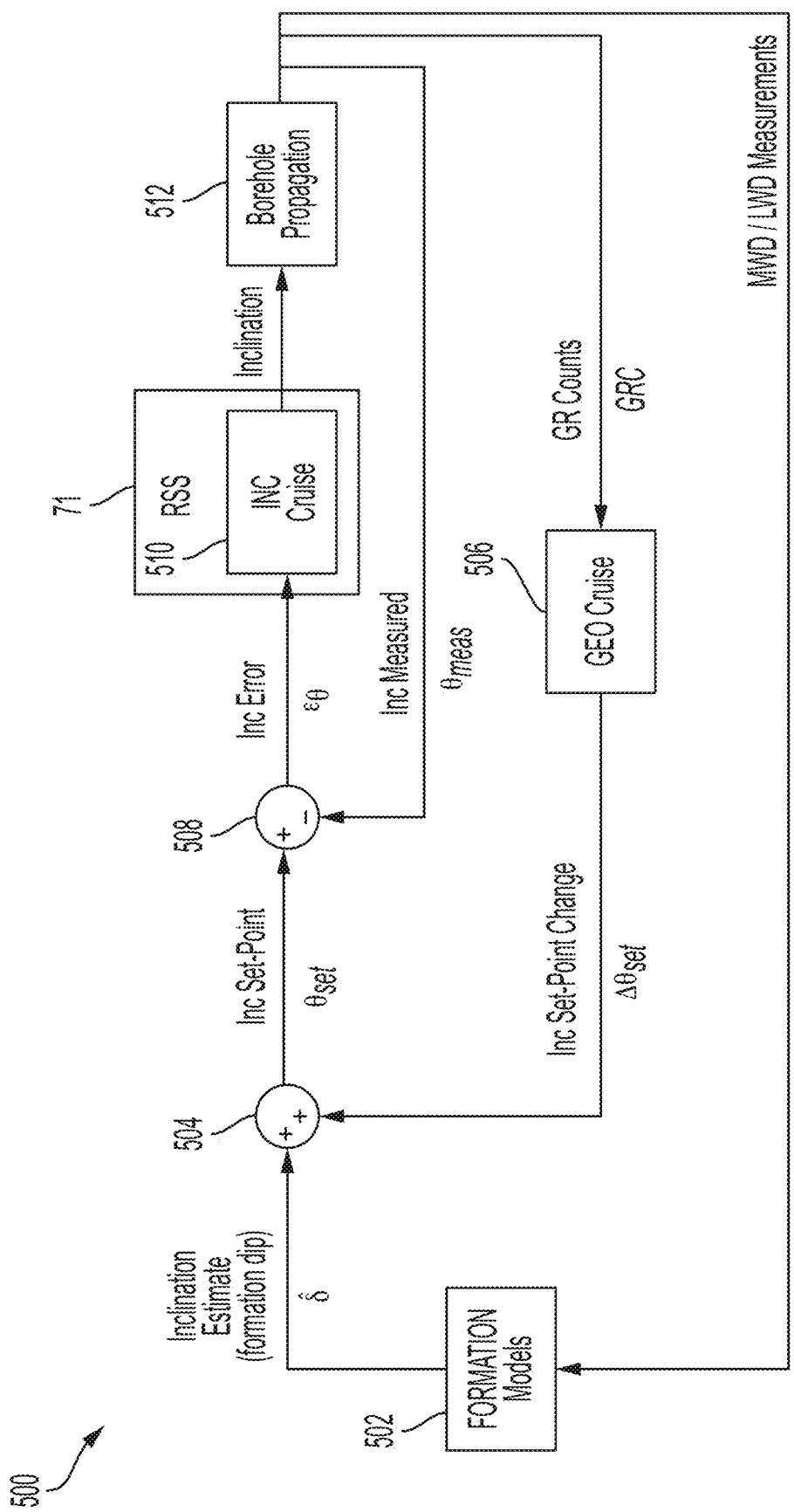
FIG. 5 depicts a block diagram of an inclination control loop of a rotary steerable system using azimuthal gamma-ray counts according to one aspect of the present disclosure.

FIG. 5 depicts a block diagram of an inclination control loop 500 of the rotary steerable system 71 using azimuthal gamma-ray counts according to one aspect of the present disclosure. Logic of the inclination control loop 500 may be performed by the trajectory control system 90, which may be located along the bottom hole assembly 64 or at the surface 16 of the wellbore 12. A geological cruise control module 506 may use azimuthal gamma-ray counts to provide a corrective set-point change in an inclination of the drill bit 66.

A target inclination of the drill bit 66 controlled by the rotary steerable system 71 may be received at an adder 504 from a formation model 502. The target inclination (e.g., an inclination or dip angle estimate S) may be determined based on the formation model 502, which may be updated by MWD and LWD measurements available in real-time. If determined at the surface 16 of the wellbore 12, the target inclination may be downlinked to the rotary steerable system 71 with a telemetry system. In an example, the target inclination may be formulated from the formation model 502 to maintain the drill bit 66 in a pay zone of the formation 14 during the drilling process.

An inclination set-point change may also be received at the adder 504 based on gamma-ray count data received at a geological cruise control module 506 from a gamma-ray detector of the measurement tools 73. In an example, the gamma-ray count data may be generated from a survey feedback during the drilling operation, and the gamma-ray count data may be used to generate the inclination set-point change. The adder 304 may combine the target inclination with the inclination set-point change to generate a new inclination set-point. In an example, the new inclination set-point may include a set-point for an inclination angle (e.g., in the vertical plane 202) of the drill bit 66.

As a feedback input, the control loop 500 may use azimuthal gamma sensor measurements. The azimuthal gamma sensor measurements may provide high-side and low-side gamma-ray counts (i.e., HS-GRC and LS-GRC, respectively). The HS-GRC may represent gamma-ray counts received on an upper-half of the wellbore 12, and the LS-GRC may represent gamma-ray counts received on a lower-half, as described below with respect to FIG. 6.

A control logic (e.g., the geological cruise control module 506) may use the HS-GRC and the LS-GRC feedback to determine an inclination set-point change $\Delta\Theta_{Set}$. The inclination set-point change may be added to the target inclination at the adder 504 as a corrective term to adjust an inclination set-point $\theta_{Set}$. The inclination set-point change may ensure that the drill bit 66 remains within the target formation based on the HS-GRC and the LS-GRC feedback.

To determine the inclination set-point change, the geological cruise control module 506 determines a difference between the HS-GRC and the LS-GRC feedback (e.g., $\Delta$GRC). Based on the difference, the inclination set-point change may be determined such that the difference between the HS-GRC and the LS-GRC remains small (e.g., within a predetermined threshold). By keeping the difference between the HS-GRC and the LS-GRC small, the drill bit 66 may be maintained toward a center portion of the target formation.

The new inclination set-point may be provided from the adder 504 to a subtractor 508. The subtractor 508 also receives a measured inclination $\theta_{Meas}$ from a prior survey feedback measurement by one or more measurement tools 73. In an example, the measurement tools 73, such as MWD tools, provide an indication of the inclination of the drill bit 66. An inclination error may be generated by the subtractor 508 by subtracting the measured inclination from the new inclination set-point. This inclination error may be provided to an inclination cruise control 510 of the rotary steerable system 71 to maintain the new inclination set-point (i.e., inclination angle) of the drill bit 66.

Borehole propagation 512 may occur using the new inclination set-point, and the measurement tools 73 may take new measurements with a subsequent survey feedback. The subsequent survey feedback by the measurement tools 73 may provide the inclination measurements to the subtractor 508, the GRC measurements to the geological cruise control module 506, and MWD measurements and LWD measurements to the formation model 502. When the formation model 502 receives the new measurements from the measurement tools 73, the formation model 502 may be updated, and a new target inclination may be generated by the formation model 502.

Figure 6:
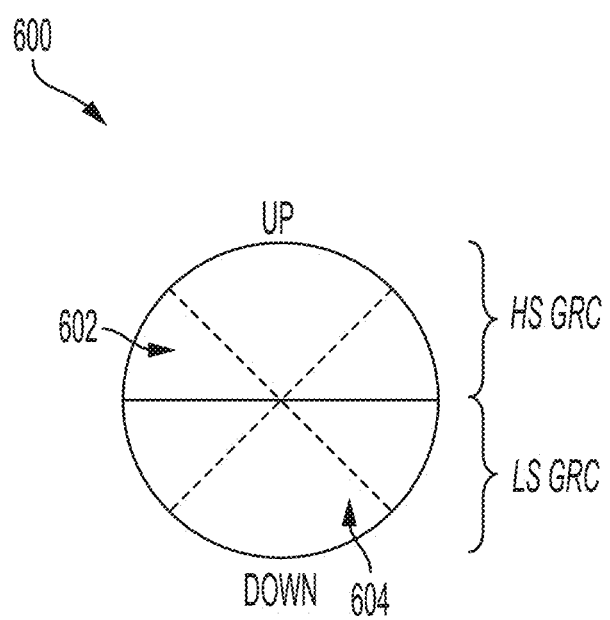
FIG. 6 is a schematic example of a two-sided gamma-ray detector according to one aspect of the present disclosure.

FIG. 6 is a schematic example of a two-sided gamma-ray detector 600 according to one aspect of the present disclosure. As discussed above with respect to FIG. 5, the two-sided gamma-ray detector 600 may receive a high-side gamma-ray count (HS-GRC) and a low-side gamma-ray count (LS-GRC). A location of a high side 602 and a low side 604 may be aligned with the inclination of the drill bit. For example, the high side 602 of the gamma-ray detector 600 may be a side of the gamma-ray detector 600 associated with a positive inclination angle (e.g., toward the surface 16), and the low side 604 may be a side of the gamma-ray detector 600 associated with a negative inclination angle (e.g., deeper into the formation 14). Gamma-ray counts received on the high side 602 and gamma-ray counts received on the low side 604 may be compared to determine how central the drill bit 66 is within a target formation.

Figure 7:
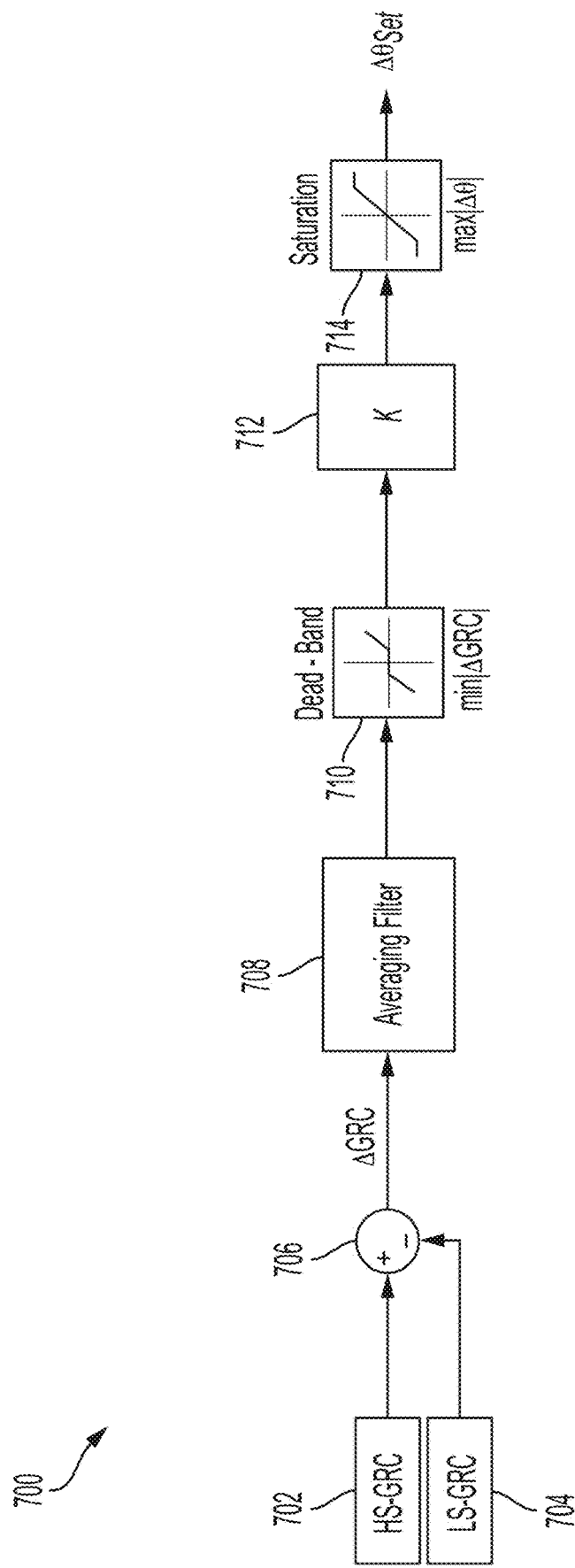
FIG. 7 depicts a control schematic for determining an inclination set-point change from gamma-ray counts at a geological cruise control module according to one aspect of the present disclosure.

FIG. 7 depicts a control schematic 700 for determining the inclination set-point change $\Delta\theta_{Set}$ from gamma-ray counts at the geological cruise control module 506 according to one aspect of the present disclosure. A difference (i.e., $\Delta$GRC) between a high-side gamma-ray count (HS-GRC) 702 and a low-side gamma-ray count (LS-GRC) 704 may be determined at a subtractor 706. The difference may be filtered by an averaging filter 708 to filter out high-frequency noise. The averaging filter 708 may be a filter of any complexity from a simple low-order, low-pass filter or a moving average filter to a high order infinite impulse response (IIR) or a finite impulse response (FIR) filter.

An output of the averaging filter 708 may be provided to a dead-band filter 710. The dead-band filter 710 may filter out small differences (i.e., $\Delta$GRC) between the HS-GRC 702 and the LS-GRC 704. A threshold represented with min|$\Delta$GRC| may be used to tune a dead-band of the dead-band filter 710. This may be particularly useful when used in a heterogeneous formation, where there may be small GRC variations within the target formation.

A multiplier 712 receives an output from the dead-band filter 710. The multiplier 712 may be represented as a proportional gain K, which is used to control performance. A magnitude of the proportional gain K may be a function of a rate of penetration (ROP), a signal-to-noise ratio (SNR) on gamma-ray measurements, a confidence level on an inclination angle estimate, and a detection range of an azimuthal gamma-ray tool (AGR), as described in the following equation:

$$|K|=f(\text{ROP},\text{SNR},\text{Confidence Level on }\hat{\delta},\text{AGR Detection Range}) \quad \text{(Equation 1)}$$

A sign of the proportional gain K may be determined by whether the gamma-ray counts within the target formation are lower or higher than in neighboring layers of formation, as represented by the following equation:

$$\text{sgn }K=f(\text{Relative Target Bed GR}) \quad \text{(Equation 2)}$$

The output of the multiplier 712 may be received at a saturation block 714. The saturation block 714 may ensure that perturbation of the inclination set-point change is maintained within a reasonable range. The range may be tuned by max|$\Delta\theta$|, as follows:

$$\hat{\delta}-\max|\Delta\theta|<\theta_{Set}<\hat{\delta}+\max|\Delta\theta| \quad \text{(Equation 3)}$$

The control parameters (e.g., min|$\Delta$GRC|, K, and max|$\Delta\theta$|) may be set prior to the drilling process and based on pre-job planning. The control parameters may also be altered in real-time by communicating with the rotary steerable system 71 through a telemetry system or based on real-time data received from MWD or LWD data packages and a steering response of the control system. In an example, the geological cruise control module 506 may include at least one of the averaging filter 708, the dead-band filter 710, the multiplier 712, and the saturation block 714.

Figure 8:
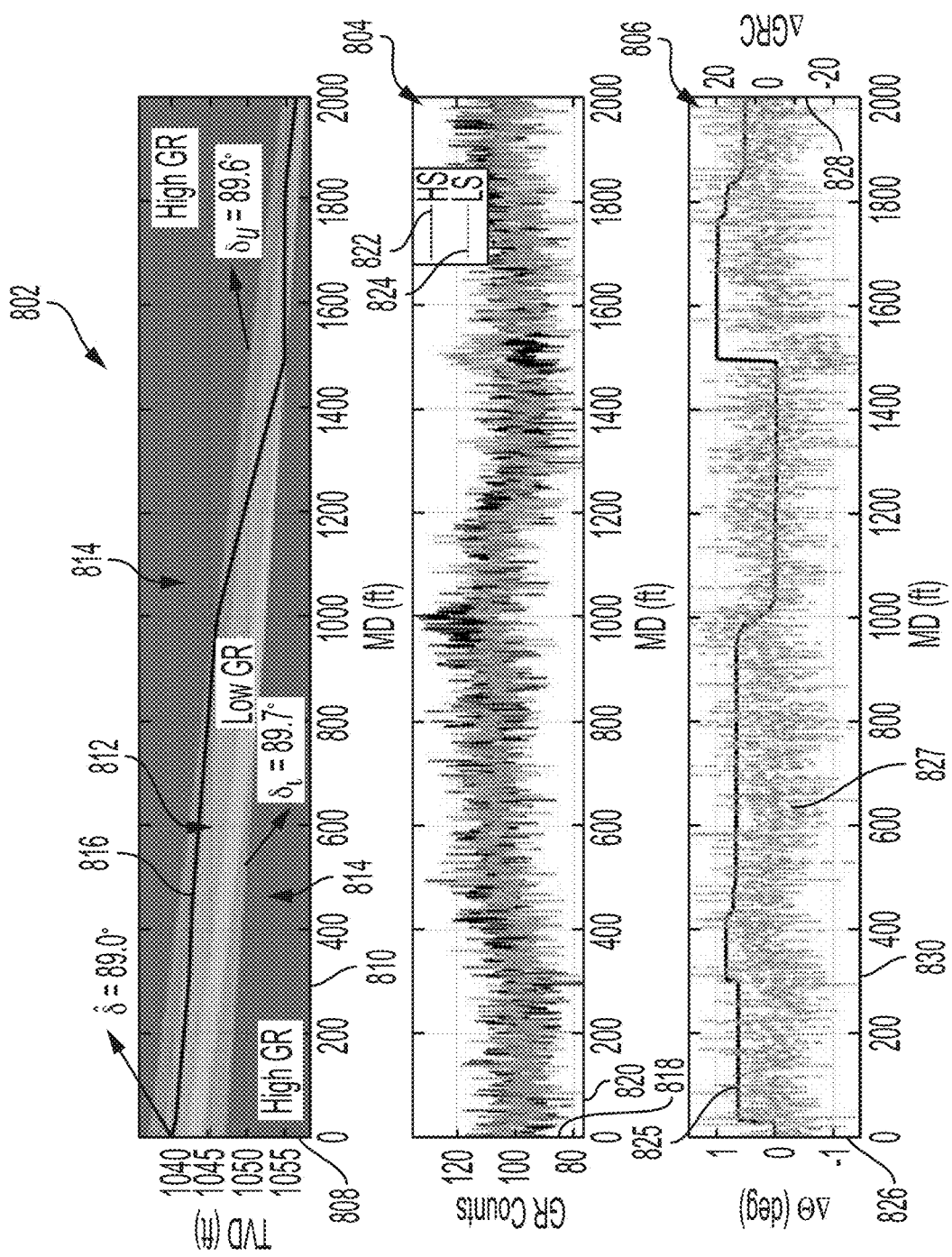
FIG. 8 is a set of graphs demonstrating inclination control within a target formation according to one aspect of the present disclosure.

FIG. 8 is a set of graphs 802, 804, and 806 demonstrating inclination control within a target formation according to one aspect of the present disclosure. The graph 802 depicts a true vertical depth (TVD) of the wellbore 12 on a vertical axis 808 and a measured depth (MD) on a horizontal axis 810. A target bed 812 (i.e., the target formation) in the graph 802 is represented as a slightly heterogeneous formation with gamma-ray counts that are relatively lower than neighboring formations 814. As illustrated, a trajectory 816 of the wellbore 12 is controlled to stay within the target bed 812 based on the gamma-ray counts received at the measurement equipment 73. For example, the geological control module 506 may correct the trajectory 816 when the difference between HS-GRC and LS-GRC exceeds a threshold, which would indicate that the drill bit 66 is nearing a boundary between the target bed 812 and the neighboring formations 814.

The graph 804 depicts gamma-ray counts on a vertical axis 818 and the measured depth (MD) on a horizontal axis 820. The gamma-ray counts are provided for both a high side 822 and a low side 824 of the gamma-ray detector 600.

The graph 806 depicts an inclination set-point change 825 on a first vertical axis 826, a difference 827 between the HS-GRC and LS-GRC on a second vertical axis 828, and the measured depth (MD) on a horizontal axis 830. In an example, the difference 827 may be provided to the averaging filter 708, the dead-band filter 710, the multiplier 712, the saturation block 714, or a combination thereof to output the inclination set-point change 825. The inclination set-point change 825 may be used by the rotary steerable system 71 to change the trajectory 816 of the drill bit 66 such that the drill bit 66 remains within the target bed 812 during a drilling operation.

While FIGS. 5-8 describe inclination control using azimuthal gamma-ray measurements, left-side gamma-ray counts and right-side gamma-ray counts at a gamma-ray detector may also be used to generate azimuth set-point changes of the drill bit 66. That is, the drill bit 66 may also be controlled in the lateral plane 204 using the gamma-ray count measurements. In such an example, a target formation azimuth may be used as a reference, and corrective set-point changes may be applied to the target formation azimuth as a change to the target formation azimuth. The corrective set-point changes for the azimuth may be based on a difference between the right-side gamma-ray counts and the left-side gamma-ray counts in a manner similar to the inclination set-point changes described above.

Further, while FIGS. 5-8 describe control using gamma-ray counts, azimuthal resistivity measurements may also be used. In such an example, attitude resistivity measurements (e.g., from the measurement tools 73 in the vertical plane 202 and the lateral plane 204) may be used as feedback to the geological cruise control module 506. Differences between up and down resistivity measurements and left and right resistivity measurements (i.e., $\Delta$R) may be used to determine corrective attitude (i.e., inclination and azimuth) set-point changes, similar to the gamma-ray count techniques. The differences in resistivity measurements may be calculated as a direct difference between the resistivity measurements or using the following logarithmic equations:

$$\Delta R_{INC}=\log_x UR-\log_x DR \quad \text{(Equation 4)}$$

$$\Delta R_{AZI}=\log_x RR-\log_x LR \quad \text{(Equation 5)}$$

where the value of x is selected as a function of the resistivity of the target formation and the surrounding formations.

In another example, differences in gamma-ray counts may be used in conjunction with differences in resistivity measurements to determine the attitude corrective set-point changes. A combined difference value may be computed as the weight sum of the difference in gamma-ray counts and the difference in resistivity, as follows:

$$\Delta=w_{\Delta GRC}\Delta\text{GRC}+w_{\Delta R}\Delta R \quad \text{(Equation 6)}$$

where the weights $w_{\Delta GRC}\in[0,1]$, $w_{\Delta R}\in[0,1]$, and $w_{\Delta GRC}+w_{\Delta R}=1$. The weights may be determined as a function of measurement quality and a sensor distance to the drill bit 66. The combined difference may be used to determine a corrective set-point change in attitude (i.e., inclination and azimuth) by the geological cruise control module 506.

Figure 9:
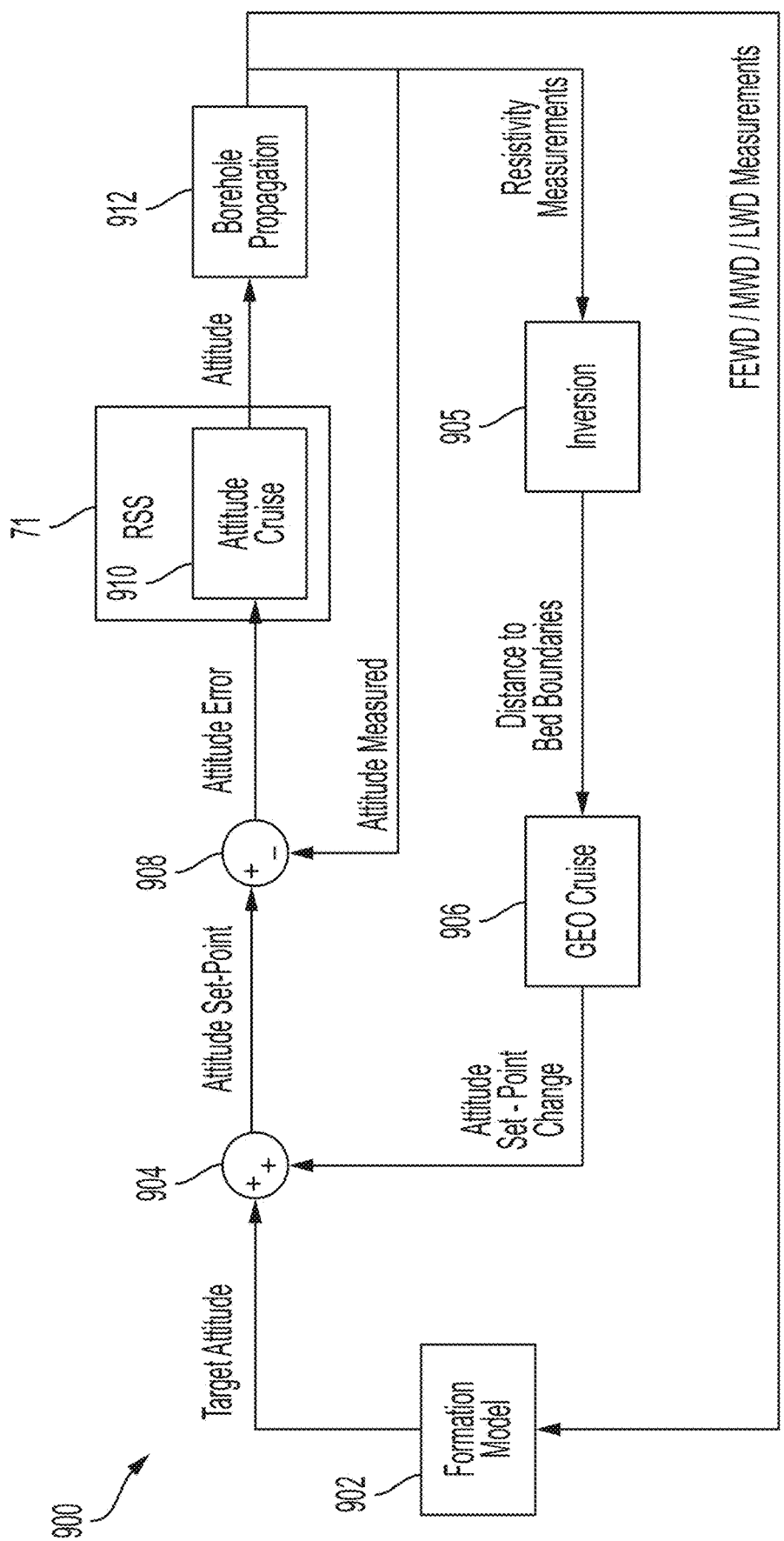
FIG. 9 depicts a block diagram of an attitude control loop of a rotary steerable system using resistivity measurements according to one aspect of the present disclosure.

FIG. 9 depicts a block diagram of an attitude control loop 900 of the rotary steerable system 71 using resistivity measurements according to one aspect of the present disclosure. Logic of the attitude control loop 900 may be performed by the trajectory control system 90, which may be located along the bottom hole assembly 64 or at the surface 16 of the wellbore 12. A distance to an edge of a geological structure may be determined using a resistivity sensor of the measurement tools 73. The structure may be identified by using a gradient of a sensed resistivity value or by using fixed values or ranges of values that can define a structure.

A target attitude of the drill bit 66 controlled by the rotary steerable system 71 may be received at an adder 904 from a formation model 902. The target attitude may be generated based on a target formation indicated in the formation model 902. For example, the target attitude may be formulated from the formation model 902 to maintain the drill bit 66 in a pay zone of the formation 14 during the drilling process. An attitude set-point change may also be received at the adder 304 based on (i) resistivity measurement information received at an inversion module 905 from a resistivity sensor and (ii) distances to bed boundaries generated by the inversion module 905 and received at a geological cruise control module 906. In an example, the resistivity measurement information may be generated as survey feedback during the drilling operation. The adder 904 may combine the target attitude with the attitude set-point change to generate a new attitude set-point. In an example, the new attitude set-point may include a set-point for both an inclination angle (e.g., in the vertical plane 202) and an azimuth angle (e.g., in the lateral plane 204) of the drill bit 66.

The distance to bed boundaries in the formation may be identified using several techniques at the inversion module 905. For example, the sense frequency of the resistivity measurement by a resistivity sensor may be controlled. Low frequency transmission may reach out further from the resistivity sensor with lower resolution and accuracy than high-frequency transmissions that are able to measure formation resistivity at a smaller distance with greater accuracy and resolution. A radial profile of formation resistivity around the resistivity sensor may be generated using base resistivity measurement values along with azimuthal binning of the measured resistivity values. To determine a distance of the geological structures from the resistivity sensor, an inversion calculation may be performed that attempts to represent what the surrounding geological structure looks like based on a distance and resistivity from a sensed point. In many instances, a series of measurements of depths of investigation, measurements of angular orientation, and making such measurements over a depth interval may aid in generating a geological profile through the inversion process. An actual distance of structure edges (i.e., distances to bed boundaries) from the resistivity sensor may be calculated from the inversion. As the resistivity values change, rules may be applied to define boundaries or thresholds of the structures based on the distance from the resistivity sensor.

Further, a resistivity sensor with two or more spaced receivers may enable a greater depth of investigation into the formation 14. The resistivity sensor may also include a tilted antenna structure or an X-Y focusing pair of loop antennas. Measurements from the resistivity sensor may be used to generate a three-dimensional view of formation anisotropy rather than a traditional X-Y radial measurement with co-axial antennas.

The new attitude set-point may be provided from the adder 904 to a subtractor 908. The subtractor 908 also receives a measured attitude from a prior survey feedback measurement by one or more measurement tools 73. In an example, the measurement tools 73, such as MWD or LWD tools, provide an indication of the attitude of the drill bit 66. The attitude may include both an inclination angle and an azimuth angle of the drill bit 66. An attitude error may be generated by the subtractor 908 by subtracting the measured attitude from the new attitude set-point. This attitude error may be provided to an attitude cruise control 910 of the rotary steerable system 71 to maintain the new attitude set-point (i.e., attitude) of the drill bit 66.

Borehole propagation 912 may occur using the new trajectory set-point, and the measurement tools 73 may take new measurements with a subsequent survey feedback. The subsequent survey feedback by the measurement tools 73 may provide the trajectory measurements to the subtractor 908, the resistivity measurements to the inversion module 905, and FEWD measurements, MWD measurements, LWD measurements, or a combination thereof to the formation model 902. When the formation model 902 receives the new measurements from the measurement tools 73, the formation model 902 may be updated, and a new target trajectory may be generated by the formation model 902.

Figure 10:
FIG. 10 is an example of a three-dimensional inversion of geological structures that is generated from resistivity measurements of a resistivity sensor according to one aspect of the present disclosure.

FIG. 10 is an example of a three-dimensional inversion 1000 of geological structures that is generated from resistivity measurements of a resistivity sensor according to one aspect of the present disclosure. In another example, the three-dimensional inversion 1000 may be generated from other measurement tools of the measurement tools 73 in the bottom hole assembly 64. In an additional example, the three-dimensional inversion 1000 may be generated by geological measurements obtained in nearby wells that were previously drilled. The three-dimensional inversion 1000 may be used to maintain the trajectory of the wellbore 12 within target formations.

Using the inversion 1000, a geological cruise control module 906 may derive an objective, such as a drilling trajectory and target. For example, the geological cruise control module 906, being able to look ahead of the present location of the drill bit 66 within the formation using the inversion 1000 (e.g., as opposed to only a radial view of the formation 14), may determine that there is a geological river bed 1002 that the wellbore 12 should follow based on a drilling cost versus profit analysis. In another example, the inversion 1000 may identify a salt formation in a trajectory of the drill bit 66, and the geological cruise control module 906 may make a determination that it would be less expensive to drill around the salt formation. Further, the geological cruise control module 906 may be able to determine which tributary 1004 or 1006 to follow at a fork 1008. For example, the inversion 1000 may provide a mechanism for determining which of the tributaries 1004 or 1006 likely has a better pay zone. Thus, the inversion 1000 may enable steering determinations based on a three-dimensional structure of the formation 14.

The inversion 1000 may also provide a mechanism for locating man-made structures within the formation 14. For example the three-dimensional inversion 1000 may sense casing structures, other drill strings in adjacent wellbores, etc. The geological cruise control module 906 may use this information to control the rotary steerable system 71 to intersect the man-made structure or to avoid the man-made structure.

A profile of a target well may be determined by the inversion 1000. Using surveys from the previously drilled target well, a match between the sensed profile of the present well to the survey data of the previously drilled target well may enable a determination of a precise location of the target well ahead of the presently drilled well (e.g., where the presently drilled well is not able to see yet). A correlation between the sensed path of the present well and a measured path of the target well may be compared and differences may be adjusted using a regression method or a simple step change correction for the inversion 1000 to match the survey data of the target well. This may be performed dynamically while the well is drilled.

In some examples, the inversion 1000 may be generated using look-ahead sensing. For example, the inversion 1000 may be based on information received by sensors both in a direction radially outward from the sensors of the measurement tools 73 and also in a direction ahead of the sensors (e.g., in a drilling direction). The look-ahead sensing techniques may enable the geological cruise control module 906, or an artificial intelligence or Bayesian or Bayes Naive probability decision making process, to control the rotary steerable system 71 in a direction that is the most probabilistically successful direction.

The look-ahead sensing may be combined with the radial measurements to constantly construct a better representation of the formation 14. The combination of measurements may be performed by iteratively smoothing a transition of the radial data with the look-ahead data to generate a best fit of the two data sets. The look-ahead sensing may encompass half of a sphere in a direction of the trajectory of the drill bit 66. Further, the measurement at the bit may also extend in a direction opposite the trajectory of the drill bit 66 such that the sensing region is a complete sphere surrounding the measurement tools 73. The look-behind information and the radial information may be used to help create a correlation between a resistivity sensor positioned further uphole on the bottom hole assembly 64 that may intersect to some degree with the look-behind data. The uphole resistivity sensor may help correlate measurements made by the downhole sensor.

Multiple types of sensors may be used to define the geological structure of interest indicated in the three-dimensional inversion 1000. For example, a gamma-ray detector may be very capable of determining a distinction between shale and sand, but may not be as capable of distinguishing coal and sand. Thus, drilling into a bed of sand with an underlying coal bed may require additional sensors to help distinguish the nature of the formation. An autonomous drilling system may selectively use various sensors to determine formation types for steering control of the rotary steerable system 71. Additionally, the autonomous drilling system may selectively increase or decrease measurement fidelity of whichever sensors are selected through an autocorrelation algorithm to increase a probability of correctly identifying a formation or a property of interest of the formation (e.g., stress profile, brittleness, etc.).

Figure 11:
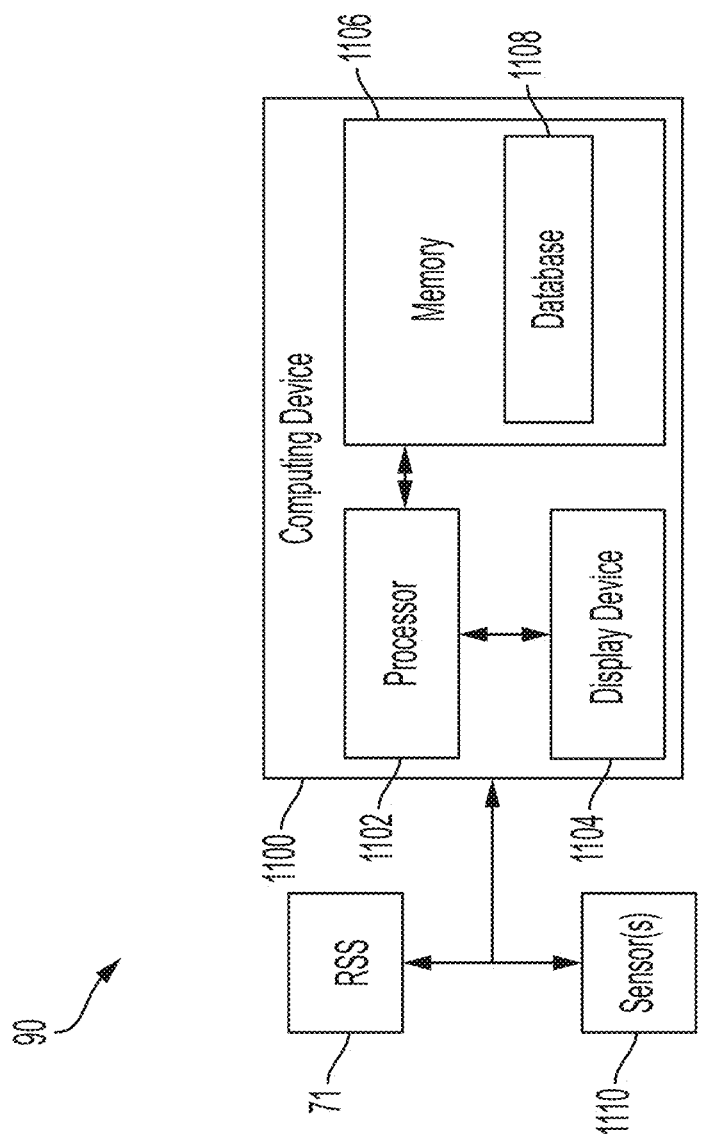
FIG. 11 is a block diagram of an example of a trajectory control system according to one aspect of the present disclosure.

FIG. 11 is a block diagram of the trajectory control system 90 according to some examples of the present disclosure. The trajectory control system 90 can include a computing device 1100 having a processor 1102, a display device 1104, and a memory 1106. In some examples, the components shown in FIG. 6 (e.g., the processor 1102, the display device 1104, and the memory 1106) can be integrated into a single structure. For example, the components can be within a single housing. In other examples, the components shown in FIG. 11 can be distributed (e.g., in separate housings) and in electrical communication with each other.

Sensor(s) 1110 can be communicatively coupled to the computing device 1100 to transmit information about the location of the drill bit 66 within the wellbore 12 and information about the formation 14 surrounding the drill bit 66. Examples of the sensors 1110 can include measurement-while-drilling (MWD) sensors, logging-while-drilling (LWD) sensors, gamma-ray detectors, resistivity sensors, density sensors, nuclear magnetic resonance sensors, acoustic sensors or any other sensors useable to measure formation properties or rock classification and position and attitude of the drill bit 66. In an example, the sensors 1110 may be arranged as part of the rotary steerable system 71 (e.g., integrated within the rotary steerable system 71). In another example, the sensors 1110 may be separate from, but communicatively coupled to, the rotary steerable system 71. Further, the formation properties and the rock classification may be determined using at least a combination of two or more of the sensors 1110. In an example, formation properties such as fluid mobility may be determined using two or more of the sensors 1110, or rock classifications such as a sand or shale formation may be determined using two or more of the sensors 1110.

The processor 1102 can execute one or more operations for implementing some examples. The processor 1102 can execute instructions stored in the memory 1106 to perform the operations. The processor 1102 can include one processing device or multiple processing devices. Non-limiting examples of the processor 1102 include a Field-Programmable Gate Array ("FPGA"), an application-specific integrated circuit ("ASIC"), a microprocessor, etc.

The processor 1102 can be communicatively coupled to the memory 1106 via a bus. The non-volatile memory 1106 may include any type of memory device that retains stored information when powered off. Non-limiting examples of the memory 1106 include electrically erasable and programmable read-only memory ("EEPROM"), flash memory, or any other type of non-volatile memory. In some examples, at least some of the memory 1106 can include a medium from which the processor 1102 can read instructions. A computer-readable medium can include electronic, optical, magnetic, or other storage devices capable of providing the processor 1102 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 1106 can include a database 1108, which can include any amount and combination of the content described in previous examples. The database 1108 can store 3D mappings of well plans, mathematical equations used for generating wellbore trajectory error, data generated from the measurement tools 73, or any combination of these, among other things.

The display device 1104 can receive display signals from the processor 1102 and responsively output any information related to the wellbore trajectory or any other information useable to manage wellbore drilling operations. One example of the display device 1104 can include a liquid crystal display. Further, the rotary steerable system 71 can receive inclination and azimuth set-point changes from the processor 1102 to provide a new trajectory for the drill bit 66 controlled by the rotary steerable system 71.

In some aspects, systems and methods for controlling trajectory of a drill bit during a drilling operation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: at least one formation property sensor positionable at a bottom hole assembly within a wellbore to detect formation properties at the bottom hole assembly; a rotary steerable system positionable within the wellbore to steer a drill bit; a processing device positionable to communicatively couple to the at least one formation property sensor and the rotary steerable system; and a memory device comprising instructions that are executable by the processing device for causing the processing device to: receive a target trajectory reference from a formation model; receive sensor signals from the at least one formation property sensor representing the formation properties; compute a trajectory set-point change using the formation properties; compute a target trajectory using the target trajectory reference and the trajectory set-point change; and transmit the target trajectory to the rotary steerable system to steer the drill bit.

Example 2 is the system of example 1, wherein the instructions are further executable by the processing device for causing the processing device to: compute a wellbore trajectory error between the target trajectory and a measured trajectory of the drill bit; and transmit the wellbore trajectory error to the rotary steerable system to steer the drill bit while compensating for a difference between the target trajectory and the measured trajectory.

Example 3 is the system of examples 1-2, wherein the instructions are further executable by the processing device for causing the processing device to: update the formation model using the sensor signals from the at least one formation property sensor; and receive a new target trajectory reference from the formation model that has been updated by the sensor signals.

Example 4 is the system of examples 1-3, wherein the rotary steerable system is positionable to maintain a drilling trajectory based on the target trajectory until a new target trajectory is received at the rotary steerable system.

Example 5 is the system of examples 1-4, wherein the instructions are further executable by the processing device for causing the processing device to: perform a three-dimensional inversion on the sensor signals from the at least one formation property sensor representing the formation properties, wherein the trajectory set-point change is generated based on the three-dimensional inversion.

Example 6 is the system of example 5, wherein the trajectory set-point change is generated based on look-ahead sensing of the at least one formation property sensor to maintain the drill bit within a formation identified by the three-dimensional inversion.

Example 7 is the system of examples 1-6, wherein the target trajectory of the drill bit comprises an indication of an inclination angle and an azimuth angle of the drill bit.

Example 8 is the system of examples 1-7, wherein the at least one formation property sensor comprises a gamma-ray sensor, a resistivity sensor, a density sensor, a nuclear magnetic resonance sensor, an acoustic sensor, or any combination thereof.

Example 9 is a method comprising: receiving a target trajectory reference of a drill bit within a wellbore from a formation model; receiving formation evaluation measurements from at least one sensor positioned within the wellbore; computing a target trajectory set-point change based on real-time formation evaluation measurements; generating a target trajectory from the target trajectory reference and the target trajectory set-point change; and steering the drill bit using the target trajectory.

Example 10 is the method of example 9, further comprising: computing a wellbore trajectory error between the target trajectory and a measured trajectory of the drill bit; and steering the drill bit using the wellbore trajectory error to compensate for a difference between the target trajectory and the measured trajectory.

Example 11 is the method of examples 9-10, further comprising: updating the formation model using the formation evaluation measurements from the at least one sensor; and receiving a new target trajectory reference from the formation model that has been updated by the formation evaluation measurements.

Example 12 is the method of examples 9-11, wherein steering the drill bit comprises a rotary steerable system maintaining an inclination angle, an azimuth angle, or both identified by the target trajectory until a new target trajectory is received at the rotary steerable system.

Example 13 is the method of examples 9-12, further comprising: performing a three-dimensional inversion on the formation evaluation measurements from the at least one sensor representing a gamma-ray count, a resistivity, a density, a nuclear magnetic resonance, or a combination thereof, wherein the target trajectory set-point change is generated based on the three-dimensional inversion.

Example 14 is the method of example 13, wherein the target trajectory set-point change is generated based on a distance to one or more bed boundaries determined from the three-dimensional inversion.

Example 15 is the method of examples 9-14, wherein the target trajectory of the drill bit comprises an indication of an inclination angle, an azimuth angle, or both of a bottom hole assembly.

Example 16 is a non-transitory computer-readable medium comprising program code that is executable by a processing device for causing the processing device to: receive a target trajectory reference from a formation model; receive sensor signals from at least one sensor representing a gamma-ray count, a resistivity, a density, a nuclear magnetic resonance, or a combination thereof of a formation surrounding the at least one sensor; compute a trajectory set-point change using the gamma-ray count, the resistivity, the density, the nuclear magnetic resonance, or the combination thereof; compute a target trajectory using the target trajectory reference and the trajectory set-point change; and transmit the target trajectory to a rotary steerable system to steer a drill bit.

Example 17 is the non-transitory computer-readable medium of example 16, wherein the target trajectory comprises an indication of an inclination angle of the drill bit, an azimuth angle of the drill bit, or a combination of the inclination angle and the azimuth angle.

Example 18 is the non-transitory computer-readable medium of examples 16-17, the program code further executable for causing the processing device to: update the formation model using the sensor signals from the at least one sensor, wherein the sensor signals comprise logging while drilling data and measurement while drilling data; and receiving a new target trajectory reference from the formation model that has been updated by the sensor signals.

Example 19 is the non-transitory computer-readable medium of examples 16-18, the program code further executable for causing the processing device to: perform a three-dimensional inversion on the sensor signals from the at least one sensor representing the gamma-ray count, the resistivity, the density, the nuclear magnetic resonance, or the combination thereof, wherein the trajectory set-point change is generated based on the three-dimensional inversion.

Example 20 is the non-transitory computer-readable medium of examples 16-19, wherein the sensor signals representing the gamma-ray count comprise a high-side gamma-ray count, a low-side gamma-ray count, a left-side gamma-ray count, and a right-side gamma-ray count of a gamma-ray detector.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    at least one formation property sensor positionable at a bottom hole assembly within a wellbore to detect at least one formation property at the bottom hole assembly;
    a rotary steerable system positionable within the wellbore to steer a drill bit;
    a processing device positionable to communicatively couple to the at least one formation property sensor and the rotary steerable system; and
    a memory device comprising instructions that are executable by the processing device for causing the processing device to:
        receive a target trajectory reference from a formation model, wherein the formation model comprises an estimation of geology surrounding the wellbore;
        receive sensor signals from the at least one formation property sensor representing the at least one formation property;
        compute a trajectory set-point change using the at least one formation property and a drilling cost analysis associated with the at least one formation property;
        compute a target trajectory using the target trajectory reference and the trajectory set-point change;
        transmit the target trajectory to the rotary steerable system to steer the drill bit;
        update the formation model using the sensor signals from the at least one formation property sensor by updating the estimation of the geology surrounding the wellbore; and
        receive a new target trajectory reference from the formation model that has been updated by the sensor signals, wherein the new target trajectory reference is generated by the formation model based on the updated estimation of the geology surrounding the wellbore.

2. The system of claim 1, wherein the instructions are further executable by the processing device for causing the processing device to:
    compute a wellbore trajectory error between the target trajectory and a measured trajectory of the drill bit; and
    transmit the wellbore trajectory error to the rotary steerable system to steer the drill bit while compensating for a difference between the target trajectory and the measured trajectory.

3. The system of claim 1, wherein the rotary steerable system is positionable to maintain a drilling trajectory based on the target trajectory until a new target trajectory is received at the rotary steerable system.

4. The system of claim 1, wherein the instructions are further executable by the processing device for causing the processing device to:
    perform a three-dimensional inversion on the sensor signals from the at least one formation property sensor representing the at least one formation property, wherein the trajectory set-point change is generated based on the three-dimensional inversion.

5. The system of claim 4, wherein the trajectory set-point change is generated based on look-ahead sensing of the at least one formation property sensor to maintain the drill bit within a formation identified by the three-dimensional inversion.

6. The system of claim 1, wherein the target trajectory of the drill bit comprises an indication of an inclination angle and an azimuth angle of the drill bit.

7. The system of claim 1, wherein the at least one formation property sensor comprises a gamma-ray sensor, a resistivity sensor, a density sensor, a nuclear magnetic resonance sensor, an acoustic sensor, or any combination thereof.

8. A method comprising:
    receiving a target trajectory reference of a drill bit within a wellbore from a formation model, wherein the formation model comprises an estimation of geology surrounding the wellbore;
    receiving formation evaluation measurements from at least one sensor positioned within the wellbore;
    computing a target trajectory set-point change based on real-time formation evaluation measurements and a drilling cost analysis associated with the real-time formation evaluation measurements;
    generating a target trajectory from the target trajectory reference and the target trajectory set-point change;
    steering the drill bit using the target trajectory;
    updating the formation model using the formation evaluation measurements from the at least one sensor by updating the estimation of the geology surrounding the wellbore; and
    receiving a new target trajectory reference from the formation model that has been updated by the formation evaluation measurements, wherein the new target trajectory reference is generated by the formation model based on the updated estimation of the geology surrounding the wellbore.

9. The method of claim 8, further comprising:
    computing a wellbore trajectory error between the target trajectory and a measured trajectory of the drill bit; and
    steering the drill bit using the wellbore trajectory error to compensate for a difference between the target trajectory and the measured trajectory.

10. The method of claim 8, wherein steering the drill bit comprises a rotary steerable system maintaining an inclination angle, an azimuth angle, or both identified by the target trajectory until a new target trajectory is received at the rotary steerable system.

11. The method of claim 8, further comprising:
    performing a three-dimensional inversion on the formation evaluation measurements from the at least one sensor representing a gamma-ray count, a resistivity, a density, a nuclear magnetic resonance, or a combination thereof, wherein the target trajectory set-point change is generated based on the three-dimensional inversion.

12. The method of claim 11, wherein the target trajectory set-point change is generated based on a distance to one or more bed boundaries determined from the three-dimensional inversion.

13. The method of claim 8, wherein the target trajectory of the drill bit comprises an indication of an inclination angle, an azimuth angle, or both of a bottom hole assembly.

14. A non-transitory computer-readable medium comprising program code that is executable by a processing device for causing the processing device to:
 receive a target trajectory reference from a formation model, wherein the formation model comprises an estimation of geology surrounding a wellbore;
 receive sensor signals from at least one sensor representing a gamma-ray count, a resistivity, a density, a nuclear magnetic resonance, or a combination thereof of a formation surrounding the at least one sensor;
 compute a trajectory set-point change using the gamma-ray count, the resistivity, the density, the nuclear magnetic resonance, or the combination thereof and a drilling cost analysis associated with the gamma-ray count, the resistivity, the density, the nuclear magnetic resonance, or any combination thereof;
 compute a target trajectory using the target trajectory reference and the trajectory set-point change;
 transmit the target trajectory to a rotary steerable system to steer a drill bit;
 update the formation model using the sensor signals from the at least one sensor, wherein the sensor signals comprise logging while drilling data and measurement while drilling data by updating the estimation of the geology surrounding the wellbore; and
 receive a new target trajectory reference from the formation model that has been updated by the sensor signals, wherein the new target trajectory reference is generated by the formation model based on the updated estimation of the geology surrounding the wellbore.

15. The non-transitory computer-readable medium of claim 14, wherein the target trajectory comprises an indication of an inclination angle of the drill bit, an azimuth angle of the drill bit, or a combination of the inclination angle and the azimuth angle.

16. The non-transitory computer-readable medium of claim 14, the program code further executable for causing the processing device to:
 perform a three-dimensional inversion on the sensor signals from the at least one sensor representing the gamma-ray count, the resistivity, the density, the nuclear magnetic resonance, or the combination thereof, wherein the trajectory set-point change is generated based on the three-dimensional inversion.

17. The non-transitory computer-readable medium of claim 14, wherein the sensor signals representing the gamma-ray count comprise a high-side gamma-ray count, a low-side gamma-ray count, a left-side gamma-ray count, and a right-side gamma-ray count of a gamma-ray detector.

* * * * *